United States Patent [19]
Yamamoto et al.

[11] Patent Number: 6,111,044
[45] Date of Patent: Aug. 29, 2000

[54] THERMOSETTING COMPOSITIONS, COATING COMPOSITIONS METHOD OF COATING, AND COATED ARTICLES

[75] Inventors: Toshio Yamamoto, Yokohama; Kazuhi Koga; Yoshiaki Marutani, both of Hiroshima; Hiroshi Kubota, Hiroshima-ken; Tadamitsu Nakahama; Mika Ohsawa, both of Hiroshima, all of Japan

[73] Assignees: NOF Corporation, Tokyo; Mazda Motor Corporation, Hiroshima-Ken, both of Japan

[21] Appl. No.: 08/952,149

[22] PCT Filed: Mar. 4, 1997

[86] PCT No.: PCT/JP97/00647

§ 371 Date: Nov. 4, 1997

§ 102(e) Date: Nov. 4, 1997

[30] Foreign Application Priority Data

Mar. 4, 1996 [JP] Japan ................................ 8-046185

[51] Int. Cl.$^7$ .................................................. C08F 124/00
[52] U.S. Cl. ...................... 526/266; 525/327.3; 526/273; 528/296; 528/297
[58] Field of Search ...................... 520/266, 273; 528/296, 297

[56] References Cited

U.S. PATENT DOCUMENTS 4,746,714  5/1988  Spinelli et al. ..................... 525/286

FOREIGN PATENT DOCUMENTS

| | | |
|---|---|---|
| 4-218561 | of 0000 | Japan . |
| 4-81419 | of 0000 | Japan . |
| 5-9975 | of 0000 | Japan . |
| 6-145302 | of 0000 | Japan . |
| 6-293823 | of 0000 | Japan . |
| 62-212416 | of 0000 | Japan . |
| 7-145228 | of 0000 | Japan . |
| 8-1089 | of 0000 | Japan . |
| 8-120216 | of 0000 | Japan . |
| 8-269391 | of 0000 | Japan . |
| 8-41208 | of 0000 | Japan . |
| 8-73708 | of 0000 | Japan . |

*Primary Examiner*—Bernard Lipman
*Attorney, Agent, or Firm*—Darby & Darby

[57] ABSTRACT

A thermosetting composition which gives a cured product having excellent weatherability, chemical and physical properties, in particular acid resistance and abrasion resistance, at a relatively low temperature, which has superior storage stability, and which can be used as a one component coating material; a coating composition utilizing this thermosetting composition; a method of coating; and a coated article are provided. The thermosetting composition contains a resin having at least one functional group selected from the group consisting of a blocked hydroxyl group, blocked carboxylic acid, and an epoxy group. The thermosetting composition has a blocked hydroxyl group, blocked carboxylic acid, and an epoxy group.

4 Claims, No Drawings

THERMOSETTING COMPOSITIONS, COATING COMPOSITIONS METHOD OF COATING, AND COATED ARTICLES

FIELD OF THE INVENTION

The present invention relates to thermosetting compositions, coating compositions, method of coating, and coated articles. More specifically, the present invention relates to thermosetting compositions having a blocked hydroxyl group, blocked carboxylic acid, and an epoxy group, all of which are functional groups; coating compositions having excellent storage stability and providing coating films with superior chemical and physical properties such as acid resistance and abrasion resistance, as well as excellent weatherability; and a method of coating and coated articles using such coating compositions and having excellent appearance of the finished coating.

BACKGROUND OF THE INVENTION

In the field of thermosetting coating materials including those for automobiles, cross-liked coating materials employing amino resins such as melamine resins as a hardening agent have typically been used for a long time due to the excellent appearance and weatherability of the resulting coating films, as well as stability and economical efficiency. Recently, however, it has been revealed that coating films having melamine type cross-linking are suffered from depressed water spots (etching) which cannot be washed off with water, which has become a serious problem. Further, as the number of automobiles coated with dark-hued coating materials has been increasing, scratches made with brushes in washing have also been a remarkable problem. Accordingly, coating materials for automobiles having superior abrasion resistance against scratches are strongly demanded.

In order to overcome these problems, compositions having various hardening systems have been proposed. For example, Japanese Laid-open Patent Application No. 51-114429, EP-A-29 595, U.S. Pat. Nos. 4,371,667, 4,650,718, 4,618,811, 4,703,101, and 4,764,430 disclose compositions including a combination of a carboxyl group and an epoxy group.

U.S. Pat. No. 3,505,297, Japanese Laid-open Patent Application Nos. 60-88038 and 2-115238 disclose compositions including a combination of a carboxyl group and an oxazoline group.

These thermosetting compositions give cured products having excellent chemical and physical properties as well as weatherability, and are widely utilized in the fields of coating materials, inks, adhesives, and molded plastics.

However, reactivity between the carboxyl group and the above-mentioned reactive functional groups is so high that compositions containing both a compound having a carboxyl group and a compound having such reactive functional groups are often gelled during storage and the period suitable for the service of the compositions is short.

Compounds having a carboxyl group used for the conventional thermosetting compositions have drawbacks that their solubility in generally used organic solvents is low and that their compatibility with the compounds having functional groups reactive with a carboxyl group is inferior, since the carboxyl group has a strong hydrogen bond. Thus, when the thermosetting compositions containing such compounds are used as a top coating material, it is difficult to prepare high solid coating materials, and appearance of the finished coating is inferior.

Japanese Laid-open Patent Application No. 3-172318 discloses a coating film produced by curing a coating composition containing a blocked hydroxyl group, an acid anhydride group, an epoxy group, and a hydrolytic silyl group. This coating film has excellent acid resistance and abrasion resistance and thus is useful, but the storage stability of the coating material is not sufficiently high.

DISCLOSURE OF THE INVENTION

It is an object of the present invention to provide thermosetting compositions and coating compositions containing such compositions, which give cured products having excellent weatherability as well as chemical and physical properties, in particular superior acid resistance and abrasion resistance, at a relatively low temperature, which exhibit excellent storage stability, and which may be used as one component coating compositions.

It is another object of the present invention to provide a method of coating which discharges only a small amount of organic solvents and which gives excellent appearance to the finished coating, and coated articles obtained by such a method.

The present inventors have made intensive investigations for developing thermosetting compositions which give coating compositions having the above-mentioned desired properties. As a result, they have discovered that compounds having, as functional groups, (1) ablockedhydroxyl group obtained by reacting polymerizable unsaturated monomers having a hydroxyl group with either a vinyl ether group or a heterocyclic group having a vinyl type double bond and an oxygen atom as the hetero atom, (2) blocked carboxylic acid obtained by reacting a carboxylic acid compound with a vinyl ether group, a vinyl thioether group, or a heterocyclic group having a vinyl type double bond and an oxygen or sulfur atom as the hetero atom, and (3) an epoxy group, and use of a thermal latent catalyst which is activated during curing by heating, will give coating compositions giving superior storage stability to the coating materials and superior abrasion resistance and acid resistance to the cured products, thereby completing the present invention.

According to the present invention, there is provided a thermosetting composition comprising a resin having at least one functional group selected from the group consisting of a blocked hydroxyl group, blocked carboxylic acid, and an epoxy group, said composition having a blocked hydroxyl group, blocked carboxylic acid, and an epoxy group.

According to the present invention, there is also provided a coating composition comprising the above-mentioned thermosetting composition and a thermal latent catalyst activated during curing by heating.

According to the present invention, there is further provided a method of coating an article comprising the steps of applying the above-mentioned coating composition over an article to be coated, and curing the applied coating composition by heating to form a coating film over the article.

According to the present invention, there is also provided a coated article coated by the above method.

PREFERRED EMBODIMENTS OF THE INVENTION

The blocked hydroxyl group in the present invention may have the structure represented by the formula (1) or (2) below:

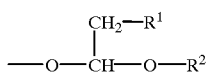

(1)

wherein $R^1$ stands for a hydrogen atom or an alkyl group having 1 to 10 carbon atoms, $R^2$ stands for an alkyl group having 1 to 22 carbon atoms in which hydrogen is substituted or not substituted by at least one member selected from the group consisting of a cycloalkyl group, an aralkyl group, an aryl group, an alkoxyl group, an alkanoyloxy group, an alkyl group having 1 to 18 carbon atoms, and a halogen atom;

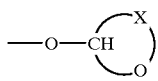

(2)

wherein X stands for an alkylene group having 1 to 18 carbon atoms in which hydrogen is substituted or not substituted by at least one member selected from the group consisting of an alkoxyl group, an aralkyl group, an aryl group, an aryloxy group, an alkanoyloxy group, an alkyl group having 1 to 10 carbon atoms, and a halogen atom.

Examples of compounds including the structure represented by the formula (1) may include 1-alkoxy-ethoxyethyl (meth)acrylates such as 1-methoxy-ethoxyethyl (meth)acrylate, 1-ethoxy-ethoxyethyl (meth)acrylate, 1-butoxy-ethoxyethyl (meth)acrylate, 1-(2-ethylhexanoxy)-ethoxyethyl (meth)acrylate, 1-isobutoxy-ethoxyethyl (meth)acrylate, or 1-cyclohexyloxy-ethoxyethyl (meth)acrylate.

The compound including the structure represented by the formula (1) maybe a compound obtained by adding alkyl vinyl ethers to the hydroxyl group in the polymerizable unsaturated monomers having a hydroxyl group, but is not limited thereto. For example, a compound including a structure obtained by adding ε-caprolactone to N-methylol (meth)acrylamide or β-hydroxyethyl (meth)acrylate, or a compound including a structure obtained by adding a vinyl ether compound to (meth)acrylates of polyoxyalkylene glycol may also be used. The vinyl ether compound subjected to the above addition reaction may be aliphatic vinyl ether compounds such as methyl vinyl ether, ethyl vinyl ether, isopropyl vinyl ether, n-propyl vinyl ether, n-butyl vinyl ether, isobutyl vinyl ether, 2-ethylhexyl vinyl ether, or cyclohexyl vinyl ether. Further, the compound including the structure of (1) may be a compound including a structure obtained by adding a vinyl ether compound to a hydroxyl group in polyester polyol, polyether polyol, or acryl polyol.

Monomers including the structure represented by the formula (2) may typically be compounds represented by the formulae below:

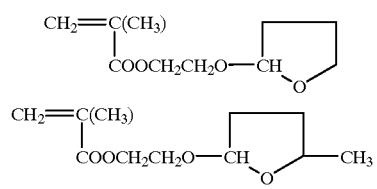

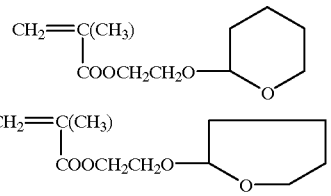

The monomer including the structure represented by the formula (2) may be a compound including a structure obtained by adding a heterocyclic compound having a vinyl type double bond and an oxygen atom as the hetero atom to the hydroxyl group in an unsaturated monomer having a hydroxyl group, but is not limited thereto. For example, a compound obtained by adding ε-caprolactone to N-methylol (meth)acrylamide or β-hydroxyethyl (meth)acrylate; or a compound including a structure obtained by adding a heterocyclic compound having a vinyl type double bond and an oxygen atom as the hetero atom to (meth)acrylates of polyoxyalkylene glycol may also be used. The heterocyclic compound having a vinyl type double bond and an oxygen atom as the hetero atom subjected to the above addition reaction may be a cyclic vinyl ether compound such as 2,3-dihydrofuran, 3,4-dihydrofuran, 2,3-dihydro-2H-pyrane, 3,4-dihydro-2H-pyrane, 3,4-dihydro-2-methoxy-2H-pyrane, 3,4-dihydro-4,4-dimethyl-2H-pyrane-2-one, 3,4-dihydro-2-ethoxy-2H-pyrane, or sodium salt of 3,4-dihydro-2H-pyrane-2-carboxylic acid. Further, the monomer including the structure of (2) maybe a compound including a structure obtained by adding a heterocyclic compound having a vinyl type double bond and an oxygen atom as the hetero atom to the hydroxyl group in polyester polyol, polyether polyol, or acryl polyol.

The blocked carboxylic acid in the present invention may have the structure represented by the formula (3)

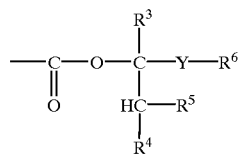

(3)

wherein $R^3$ $R^4$, and $R^5$ each stands for a hydrogen atom or an organic residue having 1 to 18 carbon atoms, and $R^6$ stands for an organic residue having 1 to 18 carbon atoms. R and R6 may be bound together to form a heterocyclic ring having Y as the hetero atom, wherein Y stands for an oxygen or sulfur atom.

Polymerizable unsaturated monomers containing the blocked carboxylic acid represented by the formula (3) as the functional group may easily be obtained by reacting a compound having a carboxyl group with an alkyl vinyl ether compound, an alkyl vinyl thioether compound corresponding thereto, or a heterocyclic compound having a vinyl type double bond and an oxygen or sulfur atom as the hetero atom. This reaction is usually proceeded in the presence of an acid catalyst at a temperature within a range from a room temperature to 100° C.

Examples of the compound having a carboxyl group may include aliphatic polycarboxylic acid having 2 to 22 carbon atoms such as succinic acid, adipic acid, azelaic acid, sebacic acid, or decamethylenedicarboxylic acid; aromatic polycarboxylic acid such as phthalic acid, isophthalic acid, terephthalic acid, trimellitic acid, or pyromellitic acid; alicyclic polycarboxylic acid such as tetrahydrophthalic acid, hexahydrophthalic acid, or methylhexahydrophthalic acid; a polyester resin, acrylic resin, or a maleinated polybutadiene resin, each having a carboxyl group.

Each of the thermosetting composition and the coating composition of the present invention (collectively referred to as "composition" hereinafter) contains one or more resins having at least one functional group selected from the group consisting of a blocked hydroxyl group, blocked carboxylic acid, and an epoxy group, and the composition includes a blocked hydroxyl group, blocked carboxylic acid, and an epoxy group as requisite functional groups. Therefore, the resin which may be contained in the composition may be a resin having one of the blocked hydroxyl group, the blocked carboxylic acid, and the epoxy group; or a resin having two or three of the blocked hydroxyl group, the blocked carboxylic acid, and the epoxy group. The resin may preferably be an acrylic resin having the number average molecular weight of 500 to 100000 or a polyester resin having the number average molecular weight of 500 to 100000. Specifically, an acrylic rein having the number average molecular weight of 500 to 100000 and having at least one functional group selected from the group consisting of a blocked hydroxyl group, blocked carboxylic acid, and an epoxy group; a polyester resin having the number average molecular weight of 500 to 100000 and having a blocked hydroxyl group and/or blocked carboxylic acid; or mixtures thereof may be used.

The acrylic resin having the number average molecular weight of 500 to 100000 and having at least one of the above functional groups may be a polymer of polymerizable unsaturated monomers containing the blocked hydroxyl group; polymerizable unsaturated monomers containing the blocked carboxylic acid; polymerizable unsaturated monomers containing the epoxy group such as glycidyl (meth) acrylate, 3,4-epoxycyclohexylmethyl acrylate, 3,4-epoxycyclohexylmethyl methacrylate; or mixtures thereof; or a polymer of one or more of these monomers and other α, β-unsaturated monomers, each obtained by conventional radical polymerization under suitably selected conditions. Examples of the above-mentioned other α, β-unsaturated monomers may include methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, cyclohexyl acrylate, cyclohexyl methacrylate, 2-ethylhexyl acrylate, 2-ethylhexyl methacrylate, stearyl acrylate, stearyl methacrylate, lauryl acrylate, lauryl methacrylate, styrene, α-methylstyrene, p-vinyltoluene, or acrylonitrile.

The acrylic resin having the number average molecular weight of 500 to 100000 and having at least one of the above functional groups may also be obtained by radical polymerization of polymerizable unsaturated monomers containing a hydroxyl group, unsaturated monomers containing a carboxyl group, polymerizable unsaturated monomers containing an epoxy group, or mixtures thereof, and optionally with other α, β-unsaturated monomers, and then blocking the hydroxyl group and the carboxylic acid therein according to the method as mentioned above.

The polyester resin having the number average molecular weight of 500 to 100000 and having the above functional groups may be obtained by synthesizing a polyester resin using a desired mole ratio of polybasic acid to a polyhydric alcohol in accordance with the conventional synthesis process to obtain a polyester resin having hydroxyl group and/or carboxyl group terminals of a desired concentration, and then blocking the hydroxyl group and carboxylic acid in the polyester resin in accordance with the above method.

Examples of the polybasic acid used for preparing the polyester resin may include aliphatic polycarboxylic acid having 2 to 22 carbon atoms such as succinic acid, adipic acid, azelaic acid, sebacic acid, or decamethylenedicarboxylic acid; aromatic polycarboxylic acid such as phthalic acid, isophthalic acid, terephthalic acid, trimellitic acid, or pyromellitic acid; alicyclic polycarboxylic acid such as tetrahydrophthalic acid, or hexahydrophthalic acid; or acid anhydride such as succinic anhydride, maleic anhydride, phthalic anhydride, tetrahydrophthalic anhydride, tetrabromophthalic anhydride, tetrachlorophthalic anhydride, hexahydrophthalic anhydride, trimellitic anhydride, or pyromellitic anhydride.

Examples of the polyhydric alcohol for preparing the polyester resin may include alcohols such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerine, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, trishydroxyethyl isocyanurate, or dipentaerythritol; addition products of these polyhydric alcohols with a lactone compound such as γ-butyrolactone or ε-caprolactone by ring opening of the lactone; addition products of these polyhydric alcohols with an isocyanate compound such as tolylene diisocyanate, diphenylmethane diisocyanate, hexamethylene diisocyanate, or isophorone diisocyanate in excess amount of the alcohol; addition products of these polyhydric alcohols with a vinyl ether compound such as ethylene glycol divinyl ether, polyethylene glycol divinyl ether, butanediol divinyl ether, pentanediol divinyl ether, hexanediol divinyl ether, or 1,4-cyclohexanedimethanol divinyl ether in excess amount of the alcohol; or condensation products of these polyhydric alcohols with an alkoxysilicon compound such as KR-213, KR-217, KR-9218 (trade names, manufactured by Shinetsu Chemical Co., Ltd.) in excess amount of the alcohol. Further, silicon oils containing a hydroxyl group such as X-22-160AS, KF-6001 (trade names, manufactured by Shinetsu Chemical Co., Ltd.) may also be used.

The acrylic resin and the polyester resin preferably have the number average molecular weight of 500 to 100000, as discussed above. If the number average molecular weight is less than 500, a large portion of the components does not have the functional groups and thus functions like a plasticizer to cause poor coating film properties such as low weatherability and moisture resistance, and inferior abrasion resistance, thus being not preferred. If the number average molecular weight exceeds 100000, the viscosity of the resin becomes exceedingly high, the amount of the nonvolatile components in the thermosetting composition at a suitable viscosity for coating becomes less, and the storage stability of the coating material is lowered, thus being not preferred.

In the composition of the present invention, the concentration of the blocked carboxylic acid as the functional group in the composition is preferably 0.5 to 4 mol/kg, more preferably 1 to 3 mol/kg based on the total solid content of the reactive resins in the composition. If the concentration of the functional group is less than 0.5 mol/kg, a cured film having sufficient cross-linking density cannot be obtained, and chemical resistance such as acid resistance, physical properties such as abrasion resistance, and weatherability of the film become poor, thus being not preferred. If the concentration of the functional group exceeds 4 mol/kg, the functional groups which do not participate in the curing reaction will remain, which adversely affects the chemical properties of the cured film, thus being not preferred.

The concentration of the blocked hydroxyl group as the functional group in the composition is preferably 0.05 to 2 mol/kg, more preferably 0.1 to 1.5 mol/kg based on the total solid content of the reactive resins in the composition. If the concentration of the functional group is less than 0.05 mol/kg, a cured film having sufficient cross-linking density cannot be obtained, and thus the physical properties such as abrasion resistance of the film become poor, thus being not preferred. If the concentration of the functional group exceeds 2 mol/kg, functional groups which do not participate in the curing reaction will remain, which adversely affects the chemical properties of the cured film, thus not being preferred.

The concentration of the epoxy group as the functional group in the composition is preferably 0.5 to 4 mol/kg, more preferably 1 to 3 mol/kg based on the total solid content of the reactive resins in the composition. If the concentration of the functional group is less than 0.5 mol/kg, a cured film having sufficient cross-linking density cannot be obtained, and chemical resistance such as acid resistance, physical properties such as abrasion resistance, and weatherability of the film become poor, thus not being preferred. If the concentration of the functional group exceeds 4 mol/kg, functional groups which do not participate in the curing reaction will remain, which adversely affects the chemical properties of the cured film, thus not being preferred.

Preferred ratio of the blocked hydroxyl group, the blocked carboxylic acid, and the epoxy group as the functional groups in the composition of the present invention is the blocked carboxylic acid/the epoxy group =0.5 to 1.5, more preferably 0.8 to 1.2, and the blocked hydroxyl group/the epoxy group =0.02 to 1.5, more preferably 0.1 to 1.0 in mole ratio.

The coating composition of the present invention contains a thermal latent acid catalyst which is activated during curing by heating for the purpose of maintaining excellent storage stability of the composition for a prolonged period of time, accelerating the curing reaction for curing the composition at a low temperature in a short time, and giving excellent chemical and physical properties to the cured product. The thermal latent acid catalyst may preferably exhibit acid catalytic activity at 60° C. or higher temperature. If the thermal latent acid catalyst exhibits the acid catalytic activity at a temperature lower than 60° C., the viscosity of the resulting composition will increase during storage and is likely to be gelled.

Examples of the thermal latent acid catalyst may preferably include a compound obtained by neutralizing protonic acid with Lewis base; a compound obtained by neutralizing Lewis acid with Lewis base; a mixture of Lewis acid and trialkyl phosphate; sulfonates; phosphates; and onium compounds.

Examples of the compound obtained by neutralizing protonic acid with Lewis base may include compounds obtained by neutralizing halogenocarboxylic acids, sulfonic acids, monoesters of sulfuric acid, monoesters or diesters of phosphoric acid, esters of polyphosphoric acid, monoesters or diesters of boric acid, with various kinds of amines such as ammonia, monoethylamine, triethylamine, pyridine, piperidine, aniline, morpholine, cyclohexylamine, n-butylamine, monoethanolamine, diethanolamine, or triethanolamine, trialkylphosphine, triarylphosphine, trialkylphosphite, ortriarylphosphite. Alternatively, Nacure 2500X, X-47-110, 3525, 5225 (trade names, manufactured by King Industries Co., Ltd.) marketed as a catalyst of acid-base adduct may also be used.

Examples of the Lewis acid used for preparing the compound obtained by neutralizing Lewis acid with Lewis base may include metal halides such as boron trifluoride, aluminum trichloride, titanium trichloride, titanium tetrachloride, ferrous chloride, ferric chloride, zinc chloride, zinc bromide, stannous chloride, stannic chloride, stannous bromide, or stannic bromide; organometal compounds such as trialkylboron, trialkylaluminum, dialkylaluminum halide, monoalkylaluminum halide, or tetraalkyltin; metal chelate compounds such as diisopropoxyethyl acetoacetate aluminum, tris(ethyl acetoacetate) aluminum, isopropoxybis (ethyl acetoacetate) aluminum, monoacetylacetonatobis (ethyl acetoacetate) aluminum, tris(n-propyl acetoacetate) aluminum, tris(n-butyl acetoacetate) aluminum, monoethyl acetoacetate· bis(acetylacetonato)aluminum, tris (acetylacetonato)aluminum, tris(propionylacetonato) aluminum, acetylacetonato· bis(propionylacetonato) aluminum, diisopropoxybis(ethyl acetoacetate) titanium, diisopropoxybis(acetyl acetoacetate) titanium, tetrakis(n-propyl acetoacetate) zirconium, tetrakis(acetylacetonato) zirconium, tetrakis(ethyl acetoacetate) zirconium, dichloro· bis(acetylacetonato)tin, dibutyl· bis(acetylacetonato)tin, tris (acetylacetonato)iron, tris(acetylacetonato)chromium, tris (acetylacetonato)rhodium, bis(acetylacetonato)zinc, or tris (acetylacetonato)cobalt; or organic metal soaps such as dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminum stearate, calcium stearate, cobalt stearate, zinc stearate, or lead stearate.

Examples of the Lewis base may include amines such as ammonia, triethylamine, pyridine, aniline, morpholine, N-methylmorpholine, pyrrolidine, N-methylpyrrolidine, piperidine, N-methylpiperidine, cyclohexylamine, n-butylamine, dimethyloxazoline, imidazole, N-methylimidazole, N,N-dimethylethanolamine, N,N-dimethylethanolamine, N,N-dipropylethanolamine, N,N-dibutylethanolamine, N,N-dimethylisopropanolamine, N,N-diethylisopropanolamine, N,N-dipropylisopropanolamine, N,N-dibutylisopropanolamine, N-methyldiethanolamine, N-ethyldiethanolamine, N-propyldiethanolamine, N-butyldiethanolamine, N-methyldiisopropanolamine, N-ethyldiisopropanolamine, N-propyldiisopropanolamine, triethanolamine, triisopropanolamine, or tri-s-butanolamine; amides such as N,N-dimethylformamide, N,N-dimethylacetamide, N-methylpyrrolidone, or hexamethylphosphoric acid triamide; sulfoxide compounds such as dimethyl sulfoxide; compounds having an ether bond such as diethyl ether or tetrahydrofuran; alkyl sulfides such as dimethyl sulfide, diethyl sulfide, di-n-propyl sulfide, di-n-butyl sulfide, di-n-hexyl sulfide, diisopropyl sulfide, di-sec-butyl sulfide, di-tert-butyl sulfide, di-n-octyl sulfide, or di-2-ethylhexyl sulfide; hydroxyalkyl sulfides such as 2-(ethylthio)ethanol, 2,2'-thiodiethanol, or bis(2-methoxyethyl) sulfide, or derivatives thereof; sulfur-containing compounds having an aromatic ring such as diphenyl sulfide or thioanisol; sulfur-containing compounds having carboxylate such as methyl methylthioacetate, ethyl methylthiopropionate, or dimethyl thiodipropionate, sulfur-containing compounds having a nitrile group such as thiodipropionitrile; or compounds such as tetrahydrothiophene, tetrahydrothiopyran, 1,2-oxathiolane, 1,3-oxathiolane, 1,3-oxathiane, or 1,4-oxathiane.

The Lewis acid used for preparing the mixture of Lewis acid and trialkyl phosphate may be the Lewis acids as listed above.

The sulfonates may be compounds represented by the formula (4):

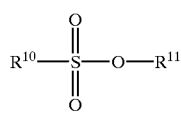

(4)

wherein $R^{10}$ stands for a phenyl group, a substituted phenyl group, a naphthyl group, a substituted naphthyl group, or an alkyl group, $R^{11}$ stands for an alkyl group having 3 to 18 carbon atoms, an alkenyl group, an aryl group, an alkalyl group, an alkanol group, a saturated or unsaturated cycloalkyl group, or hydroxycycloalkyl group, each bound to a sulfonyloxy group via a primary or secondary carbon.

Examples of the sulfonates represented by the formula (4) may include sulfonic acids such as methanesulfonic acid, ethanesulfonic acid, benzenesulfonic acid, dodecylbenzenesulfonic acid, naphthalenesulfonic acid, or nonylnaphthalenesulfonic acid, esterified with primary alcohols such as n-propanol, n-butanol, n-hexanol, or n-octanol, or secondary alcohols such as isopropanol, 2-butanol, 2-hexanol, 2-octanol, or cyclohexanol; or β-hydroxyalkyl sulfonates obtained by reacting the above-mentioned sulfonic acid with compounds containing an oxirane group.

The phosphates may include a compound represented by the formula (5).

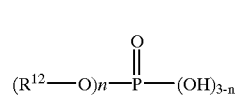

(5)

wherein $R^{12}$ stands for an alkyl group having 3 to 10 carbon atoms, a cycloalkyl group, or an aryl group, and n is an integer of 1 or 2.

Examples of the phosphates represented by the formula (5) may include phosphoric monoesters or diesters of primary alcohols such as n-propanol, n-butanol, n-hexanol, n-octanol, or 2-ethylhexanol, or those of secondary alcohols such as isopropanol, 2-butanol, 2-hexanol, 2-octanol, or cyclohexanol.

The onium compounds may include compounds represented by the formula $[(R^{13})_3NR^{14}]^+X^-$, $[(R^{13})_3PR^{14}]^+X^-$, $[(R^{13})_3OR^{14}]^+X^-$, or $[(R^{13})_3SR^{14}]^+X^-$, wherein R stands for an alkyl group having 1 to 12 carbon atoms, an alkenyl group, an aryl group, an alkalyl group, an alkanol group, or a cycloalkyl group, wherein two of $R^{13}$ may be bound together to form a heterocyclic ring having N, P, O, or S as the hetero atom, and wherein $R^{14}$ stands for a hydrogen atom, an alkyl group having 1 to 12 carbon atoms, an alkenyl group, an aryl group, or an alkalyl group, $X^-$ stands for $SbF_6^-$, $AsF_6^-$, $PF_6^-$, or $BF_4^-$.

The coating composition of the present invention may contain one or more kinds of thermal latent acid catalysts. The content of the thermal latent acid catalyst may usually be 0.01 to 20 parts by weight, preferably 0.02 to 10 parts by weight based on 100 parts by weight of the total solid content of the coating composition. If the content of the catalyst is less than 0.01 parts by weight based on 100 parts by weight of the total solid content, the amount of the catalyst is not sufficient for accelerating the reaction, whereas if the content exceeds 20 parts by weight, the amount of the catalyst is not in proportion to the effect of accelerating the reaction, and a lot of catalyst will remain in the coating composition to deteriorate the property of the coating film, thus being not preferred.

Temperature and time required for curing the composition of the present invention may vary depending on the temperature at which a free hydroxyl group or a free carboxyl group is regenerated from the blocked functional groups represented by the formulae (1) to (3) kind of the epoxy group optionally contained, or kind of the thermal latent acid catalyst. However, the curing is usually completed by heating the composition at a temperature within the range of from 60 to 300° C. for 5 seconds to 24 hours.

The composition of the present invention may be used as it is or, according to the need, as a mixture with a variety of additives such as coloring pigments, fillers, solvents, UV adsorbents, antioxidants, or flow controlling agents, for a wide range of usage such as coating materials, inks, adhesives, or molded products, utilizing the curing property.

The present composition may be prepared by mixing the above components together, and optionally mixing with a variety of additives, if necessary. The method of mixing the components and adding the variety of additives is not particularly limited, and may be selected from a variety of methods. The order of mixing and adding may also be selected suitably.

The coating composition of the present invention may be used as a single-layered top coating material or as a coating material for preparing articles having a plurality of coating film layers composed of a colored base coating film and a clear top coating film. The coating composition of the present invention is quite useful as coating materials for automobiles, coating materials for metal products used as pre-coating or post-coating materials for railway vehicles, or coating materials for electrical appliances, steel structures, machinery, building materials, insulation, moisture-proofing, and rust-prevention of electrical and electronic parts, and other industrial coatings.

In the case of such coating materials, the content of the pigment is preferably 0 to 300 parts by weight, more preferably 0 to 100 parts by weight based on 100 parts by weight of the reactive resins in the composition.

The pigments may include organic and inorganic pigments. In particular, metallic pigments such as surface treated aluminum, copper, brass, bronze, or stainless steel; iron oxides of mica form, metallic powders of flake form, or titanium oxide; or mica coated with iron oxide may be used. Further, inorganic pigments such as titanium dioxide, iron oxides, yellow iron oxide, or carbon black; organic pigments such as phthalocyanine blue, phthalocyanine green, or quinacridone red pigments; or fillers such as precipitated barium sulfate, clay, silica, or tarc may also be used.

The coating composition of the present invention may be utilized in a method for applying composite coating films on an article including the steps of applying a colored film forming composition on a substrate to form a base coating film, and applying a clear film forming composition on the base coating film to form a clear top coating film. The coating composition of the present invention may be used as the clear film forming composition for forming the top coating film, or both the clear film forming composition for forming the top coating film and the colored film forming composition in this method.

Using the coating composition of the present invention in the method of preparing a coated product having a plurality of coated films composed of colored base coating film and clear top coating film, excellent appearance of the finished coating may be achieved.

The film forming composition for the colored base coating film includes a resin binder and pigments. The resin binder may be the coating composition of the present invention, or other binders of various kinds such as well known acrylic polymers, polyester (including alkyd resins), polyurethane, or melamine resins.

Conventionally used additives of various kinds such as surface active agents, UV adsorbents, levelling agents, thixotropic agents, fillers, defoaming agents, organic solvents, or catalysts may be added to the film forming composition for the colored base coating film.

The film forming composition for the clear top coating film may be prepared with the coating composition of the present invention, optionally mixed with the above pigments, various kinds of additives, and dyes having superior weatherability to the extent that the transparency of the composition is not lowered.

Kind of the substrate on which the coating composition is applied is not particularly limited, and various kinds of substrate materials including organic and inorganic materials such as wood, glass, metal, fabric, plastics, foamed materials, elastomers, paper, ceramics, concrete, or gypsum boards may be used.

Examples of suitable methods for applying the coating composition containing the thermosetting composition of the present invention may include a method including the steps of adjusting the viscosity of the coating composition by heating or admixing with an organic solvent or reactive thinner depending on the need; applying the thus obtained coating composition using a conventional coater such as an air spray, an electrostatic air spray, a roll coater, a flow coater, or a dipping type coater, a brush, a bar coater, or an applicator, so that the dry thickness of the coated film is 0.5 to 300 $\mu$m; and curing the coated composition under heating at a temperature within the range of from 50 to 300° C. for 5 seconds to 1 hour. When the coating is carried out in two coat one bake system, the coating composition of the present invention may be applied by a method including the steps of diluting the coating composition for the base coating film with a suitable thinner such as an organic solvent into a desired viscosity; applying the diluted composition according to the above method so that the dry thickness of the coated film is usually 5 to 40 $\mu$m, preferably 7 to 35 $\mu$m; allowing the coated film to stand at a room temperature to 100° C. for 1 to 20 minutes; subsequently applying the coating composition for the clear top coating film prepared with the thermosetting composition of the present invention according to the above method so that the dry thickness of the coated film is 10 to 100 $\mu$m, preferably 10 to 60 $\mu$m; and curing the coated film under heating at 50 to 300° C. for 5 seconds to 1 hour. The most preferred coating method among those listed above is the spray coating.

The coated products which may be obtained by applying the coating composition of the present invention may include structures, wooden products, metallic products, plastic products, rubber products, coated papers, ceramic products, and glass products. Specifically, automobiles, metal plates such as steel plates, two wheelers, ships, railway vehicles, aircrafts, furniture, musical instruments, domestic appliances, building materials, containers, office supplies, sports instruments, and toys may be included.

The thermosetting composition of the present invention gives cured products having excellent chemical and physical properties as well as weatherability, and is superior in storage stability, and thus is suitably used for coating materials, inks, adhesives, or molded products. In particular, when the thermosetting composition of the present invention is used as a top coating material, discharge of the organic solvent may be reduced, and excellent appearance may be given to the finished coating film, thus being quite useful in the field of industrial coatings such as coating of automobiles. The thermosetting composition of the present invention has, when it is used for the coating composition, superior storage stability, thermosetting reactivity, abrasion resistance, and acid resistance.

EXAMPLES

The present invention will now be explained with reference to Examples. But the present invention is not limited thereto. The properties of the coating film in the Examples were determined as follows:

(1) Acid resistance

On a test piece, 2 ml of 40 wt% sulfuric acid was applied as spots, and condition of the coating film was visually observed after heating at 60° C. for 30 minutes.

(2) Impact resistance

A test piece was clamped to an impact frame of 6.35 mm radius and a weight of 500 g was dropped from the height of 40 cm onto the test piece, using an impact tester (Japanese Industrial Standard K-5400 (1994), 8.3.2., Du Pont method). Damage on the coating film was visually observed.

(3) Weatherability

A test piece was exposed for 1000 hours or 3000 hours, and then 60 degree specular gloss (Japanese Industrial Standard K-5400 (1990), 7.6 specular gloss) of the coating film was measured, using a sunshine weathermeter (Japanese Industrial Standard K-5400 (1990), 9.8.1). Condition of the coating film was visually observed, or compared with the condition before the exposure by using the measured values of gloss.

(4) Abrasion resistance

A test piece was fixed on the outer surface of the ceiling of a vehicle, and the vehicle was subjected to machine wash. The abrasion on the test piece due to the friction of the washing brush was visually observed and evaluated. The car wash was repeated twenty times.

(5) Pencil hardness

Hardness of the coated film was determined in accordance with Japanese Industrial Standard K-5400 (1994), 8.4.2.

Preparation Example 1

Preparation of Compound A-1 Having Blocked Carboxylic Acid (1) Preparation of polycarboxylic acid Following materials were charged into a four-necked flask equipped with a thermometer, a reflux condenser, a stirrer, and a dropping funnel, and heated under stirring up to 120° C.

| | |
|---|---|
| pentaerythritol | 136.0 parts by weight |
| methyl isobutyl ketone | 538.7 parts by weight |

Next, 672.0 parts by weight of methylhexahydrophthalic anhydride was added dropwise over 2 hours to the starting mixture while the temperature of the mixture was kept at 120° C., and the resulting mixture was continuously stirred under heating until the acid value of the mixture became 170 or less (determined by diluting the mixture 50 folds by weight with a 9:1 mixed solution of pyridine and water, heating the diluted mixture at 90° C. for 30 minutes, and titrated with a standard solution of potassium hydroxide), thereby obtaining a solution of a tetra functional polycaroxylic acid compound.

(2) Preparation of compound having blocked carboxylic acid

Using the solution of the polycarboxylic acid compound obtained above, a mixture having the following composition was charged in a flask as used above and stirred while the temperature of the mixture was kept at 50° C.

| Solution of polycarboxylic acid compound obtained in (1) | 336.7 parts by weight |
| Isobutyl vinyl ether | 120.2 parts by weight |
| 35 weight % hydrochloride acid | 0.2 parts by weight |
| methyl isobutyl ketone | 46.3 parts by weight |

The reaction was terminated when the acid value of the mixture became 12 or less. After the mixture was allowed to cool, the obtained product was transferred to a separating funnel. The product was subjected to alkali washing with 100 parts by weight of a 10 weight % aqueous solution of sodium carbonate in the separating funnel, and then washing repeatedly with 300 parts by weight of deionized water until the pH of the washing solution became 7 or lower. Subsequently, the resulting organic layer was dried by adding Molecular Sieve 4A1/16 and being left at room temperature for 3 days, thereby obtaining Compound A-1 having the properties as shown in Table 1.

Preparation Example 2

Preparation of Compound B-1 Having Blocked Carboxylic Acid and Blocked Hydroxyl Group (1) Preparation of polycarboxylic acid Following materials were charged into a four-necked flask equipped with a thermometer, a reflux condenser, a stirrer, and a dropping funnel, and heated under stirring up to 120° C.

| pentaerythritol | 136.0 parts by weight |
| methyl isobutyl ketone | 402.0 parts by weight |

Next, 462.0 parts by weight of hexahydrophthalic anhydride was added dropwise over 2 hours to the starting mixture while the temperature of the mixture was kept constant at 120° C., and the resulting mixture was continuously stirred under heating until the acid value of the mixture became 170 or less (determined by diluting the mixture 50 folds by weight with a 9:1 mixed solution of pyridine and water, heating the diluted mixture at 90° C. for 30 minutes, and titrated with a standard solution of potassium hydroxide), thereby obtaining a solution of trifunctional polycarboxylic acid compound.

(2) Preparation of compound having blocked carboxylic acid and blocked hydroxyl group Using the solution of the polycarboxylic acid compound obtained above, a mixture having the following composition was charged in a flask as used above and stirred while the temperature of the mixture was kept constant at 50° C.

| Solution of polycarboxylic acid compound obtained in (1) | 317.3 parts by weight |
| Isopropyl vinyl ether | 142.5 parts by weight |
| 35 wt% hydrochloric acid | 0.2 parts by weight |
| xylene | 40.0 parts by weight |

The reaction was terminated when the acid value of the mixture became 12 or less. After the mixture was allowed to cool, the obtained product was transferred to a separating funnel. The product was subjected to alkali washing with 100 parts by weight of a 10 weight % aqueous solution of sodium carbonate in the separating funnel, and then washing repeatedly with 300 parts by weight of deionized water until the pH of the washing solution became 7 or lower. Subsequently, the resulting organic layer was dried by adding Molecular Sieve 4A1/16 and being left at room temperature for 3 days, thereby obtaining Compound B-1 having the properties as shown in Table 1.

TABLE 1

| | | Preparation example 1 | Preparation example 2 |
| --- | --- | --- | --- |
| Resin No. | | A-1 | B-1 |
| Average number of blocked carboxylic acid as functional group | | 4 | 3 |
| Average number of blocked hydroxyl group as functional group | | — | 1 |
| Blocking agent | | isobutyl vinyl ether | isopropyl vinyl ether |
| Properties | Non-volatile components (wt%)[1)] | 60% | 60% |
| | Number average molecular weight[2)] | 1150 | 980 |

Note:
[1)]non-volatile components: Dried at 50° C. at 0.1 mmHg for 3 hours.
[2)]Number Average Molecular Weight: Value obtained by measurement by gel permeation chromatography followed by calculation in terms of Polystyrene Preparation Example 3

Preparation of Compound B-2 Having Blocked Hydroxyl Group and Blocked Carboxylic Acid (1) Preparation of α, β-unsaturated compound M-1

A mixture having the composition as shown in Table 2 was charged in a four-necked flask equipped with a thermometer, a reflux condenser, and a stirrer, and stirred for 10 hours at a constant temperature of 50° C.

After the mixture was allowed to cool, the obtained product was transferred to a separating funnel. The product was subjected to alkali washing with 100 parts by weight of a 10 weight % aqueous solution of sodium carbonate in the separating funnel, and then washing repeatedly with 200 parts by weight of deionized water until the pH of the washing solution became 7 or lower. Subsequently, the resulting organic layer was dried by adding Molecular Sieve 4A1/16 (manufactured by WAKO JUNYAKU CO., LTD.) and being left at room temperature 3 days, thereby obtaining α, β-unsaturated compound M-1 having the content of the effective components as shown in Table 2.

TABLE 2

|  |  | M-1 |
|---|---|---|
| Composition of starting material (parts by weight) | 2-hydroxylethyl methacrylate | 130.0 |
|  | isopropyl vinyl ether | 112.0 |
|  | hyoroquinone monomethyl ether | 0.2 |
|  | diethyl hexyl phosphate | 0.1 |
| Content of effective components[1] (wt%) |  | 90.0 |

Note
[1]: Content of effective components was determined by gas chromatography.

(2) Preparation of α, β-unsaturated compound M-2

A mixture having the composition as shown in Table 3 was charged in a four-necked flask equipped with a thermometer, a reflux condenser, and a stirrer, and stirred for 10 hours at a constant temperature of 50° C. After the mixture was allowed to cool, the obtained product was transferred to a separating funnel. The product was subjected to alkali washing with 100 parts by weight of a 10 weight % aqueous solution of sodium carbonate in the separating funnel, and then washing repeatedly with 200 parts by weight of deionized water until the pH of the washing solution became 7 or lower. Subsequently, the resulting organic layer was dried by adding Molecular Sieve 4A1/16 (manufactured by WAKO JUNYAKU CO., LTD.) and being left at room temperature 3 days, thereby obtaining α, β-unsaturated compound M-2 having the content of the effective components as shown in Table 3.

TABLE 3

|  |  | M-2 |
|---|---|---|
| Composition of starting material (parts by weight) | methacrylic acid | 86.0 |
|  | isopropyl vinyl ether | 103.3 |
|  | hydroquinone monomethyl ether | 0.2 |
|  | diethyl hexyl phosphate | 0.1 |
| Content of effective components[1] (wt%) |  | 95.0 |

Note
[1]: Content of effective components was determined by gas chromatography (3) Preparation of compound having blocked carboxylic acid and blocked hydroxyl group Into a four-necked flask equipped with a thermometer, a reflux condenser, a stirrer, and a dropping funnel, an initial charge of solvent (xylene) was charged in an amount as shown in Table 4, and heated under stirring up to 80° C. and sustained. At the constant temperature of 80° C., a mixture containing the monomers and a polymerization initiator having the composition as shown in Table 4 (dropping components) was added dropwise at a constant rate from the dropping funnel over 2 hours, and kept at 80° C. for another hour following completion of the adding. After that, a polymerization initiator solution having the composition as shown in Table 4 (additional catalyst) was added to the mixture. The mixture was kept at 80° C. for 4 hours until the end of the reaction, thereby obtaining Compound B-2 having the properties as shown in Table 4.

Preparation Example 4

Preparation of Compound B-3 Having Blocked Carboxylic Acid and Blocked Hydroxyl Group Into a four-necked flask equipped with a thermometer, a reflux condenser, a stirrer, and a dropping funnel, an initial charge of solvent (xylene) was charged in an amount as shown in Table 4, and heated under stirring up to 80° C. and sustained. At the constant temperature of 80° C., a mixture containing the monomers and a polymerization initiator having the composition as shown in Table 4 (dropping components) was added dropwise at a constant rate from the dropping funnel over 2 hours, and kept at 80° C. for another hour following completion of the adding. After that, a polymerization initiator 5 solution having the composition as shown in Table 4 (additional catalyst) was added to the mixture. The mixture was kept at 80° C. for 4 hours until the end of the reaction, thereby obtaining Compound B-3 having the properties as shown in Table 4.

TABLE 4

|  |  | Preparation example | |
|---|---|---|---|
|  |  | 3 | 4 |
| Resin No. |  | B-2 | B-3 |
| xylene (parts by weight) |  | 16.4 | 15.8 |
| Dropping components (parts by weight) | α, β-Unsaturated Compound M-1 | 7.2 | 14.2 |
|  | α, β-Unsaturated Compound M-2 | 32.6 | 32.6 |
|  | n-butyl acrylate | 7.6 | 4.2 |
|  | 2-ethylhexyl methacrylate | 15.0 | 12.0 |
|  | 2,2'-azobisisobutylonitrile | 3.0 | 3.0 |
|  | n-butyl acetate | 15.0 | 15.0 |
| Additional catalyst (parts by weight) | n-butyl acetate | 3.0 | 3.0 |
|  | 2,2'-azobisisobutylonitrile | 0.2 | 0.2 |
| Property | non-volatile components (wt%)[1] | 60.5 | 60.6 |
| Property | Number Average Molecular Weight | 9800 | 10200 |

Note
[1]: non-volatile components: dried at 50° C. at 0.1 mmHg for 3 hours
[2]: Number Average Molecular Weight: Value obtained by measurement by gel permeation chromatography followed by calculation in terms of polystyrene Preparation Example 5

Preparation of Compound C-1 Having Epoxy Aroup

Into a four-necked flask equipped with a thermometer, a reflux condenser, a stirrer, and a dropping funnel, an initial charge of solvent (xylene) was charged in an amount as shown in Table 5, and heated under stirring up to 140° C. and sustained. At the constant temperature of 140° C., a mixture containing the monomers and a polymerization initiator having the composition as shown in Table 5 (dropping components) was added dropwise at a constant rate from the dropping funnel over 2 hours, and kept at 120° C. for additional two hours following completion of the adding. After that, a polymerization initiator solution having the composition as shown in Table 5 (additional catalyst) was added to the mixture. The mixture was kept at 120° C. for additional 2 hours until the end of the reaction, thereby obtaining Compound C-1 having the properties as shown in Table 5.

TABLE 5

|  |  | Preparation Example 5 |
|---|---|---|
| Resin No. |  | C-1 |
| xylene (parts by weight) |  | 37.4 |
| Dropping components | glycidyl methacrylate | 25.6 |

TABLE 5-continued

|  |  | Preparation Example 5 |
| --- | --- | --- |
| (parts by weight) | butyl methacrylate | 10.8 |
|  | methyl methacrylate | 3.0 |
|  | 2-ethylhexyl methacrylate | 20.6 |
|  | Perbutyl O[2] | 1.4 |
| Additional catalyst | xylene | 1.0 |
| (parts by weight) | Perbutyl O[2] | 0.2 |
| Property | Non-volatile components (wt%)[1] | 60.0 |
| Property | Number average molecular weight[3] | 11000 |

Note
[1] non-volatile components: dried at 50° C. at 0.1 mmHg for 3 hours
[2] Perbutyl O: trade name, manufactured by NOF CORPORATION, peroxide
[3] Number Average Molecular Weight : Value obtained by measurement by gel permeation chromatography followed by calculation in terms of polystyrene.

Preparation Examples 6 and 7

Preparation of Compounds D-1 and D-2 Having Blocked Hydroxyl Group and Epoxy Group Into a four-necked flask equipped with a thermometer, a reflux condenser, a stirrer, and a dropping funnel, an initial charge of solvent (xylene) was charged in an amount as shown in Table 6, and heated under stirring up to 140° C. and sustained. At the constant temperature of 140° C., a mixture containing the monomers and a polymerization initiator having the composition as shown in Table 6 (dropping components) was added dropwise at a constant rate from the dropping funnel over 2 hours, and kept at 120° C. for 2 hours following completion of the adding. After that, a polymerization initiator solution having the composition as shown in Table 6 (additional catalyst) was added to the mixture. The mixture was kept at 120° C. for 2 hours until the end of the reaction, thereby obtaining Compound D-1 and D-2 having the properties as shown in Table 6, respectively.

TABLE 6

|  |  | Preparation Example | |
| --- | --- | --- | --- |
|  |  | 6 | 7 |
| Resin No. |  | D-1 | D-2 |
| xylene (parts by weight) |  | 36.7 | 36.7 |
| Dropping components | glycidyl methacrylate | 25.6 | 29.8 |
| (parts by weight) | M-1 | 7.2 | 7.2 |
|  | butyl methacrylate | 5.9 | 5.7 |
|  | 2-ethylhexyl methacrylate | 22.0 | 18.0 |
|  | Perbutyl O[2] | 1.4 | 1.4 |
| Additional catalyst | xylene | 1.0 | 1.0 |
| (parts by weight) | Perbutyl O[2] | 0.2 | 0.2 |
| Property | Non-volatile Components (wt%)[1] | 60.2 | 60.4 |
| Property | Number average molecular weight[3] | 12000 | 11000 |

Note
[1] non-volatile components: dried at 50° C. at 0.1 mmHg for 3 hours
[2] Perbutyl O: trade name, manufactured by NOF CORPORATION, peroxide
[3] Number Average Molecular Weight: Value obtained by measurement by gel permeation chromatography followed by calculation in terms of polystyrene

Preparation Example 8

Preparation of Compound E Having Blocked Hydroxyl Group, Blocked Carboxylic Acid, and Epoxy Group Into a four-necked flask equipped with a thermometer, a reflux condenser, a stirrer, and a dropping funnel, an initial charge of solvent (xylene) was charged in an amount as shown in Table 7, and heated under stirring up to 80° C. and sustained. At the constant temperature of 80° C., a mixture containing the monomers and a polymerization initiator having the composition as shown in Table 7 (dropping components) was added dropwise at a constant rate from the dropping funnel over 2 hours, and kept at 80° C. for another hour following completion of the adding. After that, a polymerization initiator solution having the composition as shown in Table 7 (additional catalyst) was added to the mixture. The mixture was kept at 80 C for 4 hours until the end of the reaction, thereby obtaining Compound E having the properties as shown in Table 7.

TABLE 7

|  |  | Preparation Example 8 |
| --- | --- | --- |
| Resin No. |  | E |
| xylene (parts by weight) |  | 17.0 |
| Dropping components | α, β-unsaturated compound M-1 | 7.2 |
| (parts by weight) | α, β-unsaturated compound M-2 | 21.7 |
|  | glycidyl methacrylate | 17.0 |
|  | n-butyl methacrylate | 5.9 |
|  | 2-ethylhexyl methacrylate | 10.0 |
|  | 2,2'-azobisisobutyronitrile | 3.0 |
|  | butyl acetate | 15.0 |
| Additional catalyst | butyl acetate | 3.0 |
| (parts by weight) | 2,2'-azobisisobutyronitrile | 0.2 |
| Property | Non-volatile components (wt%)[1] | 60.4 |
| Property | Number average molecular weight[2] | 12000 |

Note
[1]: non-volatile components: dried at 50° C. at 0.1 mmHg for 3 hours
[2] Number Average Molecular Weight: Value obtained by measurement by gel permeation chromatography followed by calculation in terms of polystyrene

Preparation Example 9

Preparation of compound F-1 Having Blocked Hydroxyl Group

Into a four-necked flask equipped with a thermometer, a reflux condenser, a stirrer, and a dropping funnel, an initial charge of solvent (xylene) was charged in an amount as shown in Table 8, and heated under stirring up to 80° C. and sustained. At the constant temperature of 80° C., a mixture containing the monomers and a polymerization initiator having the composition as shown in Table 8 (dropping components) was added dropwise at a constant rate from the dropping funnel over 2 hours, and kept at 80° C. for another hour following completion of the adding. After that, a polymerization initiator solution having the composition as shown in Table 8 (additional catalyst) was added to the mixture. The mixture was kept at 80° C. for 4 hours until the end of the reaction, thereby obtaining Compound F-1 having the properties as shown in Table 8.

TABLE 8

|  |  | Preparation Example 9 |
|---|---|---|
| Rein No. |  | F-1 |
| xylene (parts by weight) |  | 14.5 |
| Dropping components (parts by weight) | α, β-unsaturated compound M-1 | 43.2 |
|  | α, β-unsaturated compound M-2 | — |
|  | n-butyl methacrylate | 15.0 |
|  | 2-ethylhexyl methacrylate | 6.1 |
|  | 2,2'-azobisisobutyronitrile | 3.0 |
|  | butyl acetate | 15.0 |
| Additional catalyst (parts by weight) | butyl acetate | 3.0 |
|  | 2,2'-azobisisobutyronitrile | 0.2 |
| Property | Non-volatile components (wt%)[1] | 60.4 |
| Property | Number average molecular weight[2] | 11000 |

Note
[1] non-volatile components: dried at 50° C. at 0.1 mmHg for 3 hours
[2] Number Average Molecular Weight: Value obtained by measurement by gel permeation chromatography followed by calculation in terms of polystyrene

Preparation Example 10

Preparation of compound A-2 Having Polycarboxylic Acid

Into a four-necked flask equipped with a thermometer, a reflux condenser, a stirrer, and a dropping funnel, the following components were charged, and heated up to 120° C. under stirring.

Pentaerythritol 136.0 parts by weight methyl isobutyl ketone 538.7 parts by weight Next, 672.0 parts by weight of methylhexahydrophthalic anhydride was added dropwise over 2 hours to the starting mixture while the temperature of the resulting mixture was kept constant at 120° C., and the mixture was continuously stirred under heating until the acid value of the mixture became 170 or less (determined by diluting the mixture 50 folds by weight with a 9 : 1 mixed solution of pyridine and water, heating the diluted mixture at 90° C. for 30 minutes, and titrated with a standard solution of potassium hydroxide), thereby obtaining a solution of tetra functional polycarboxylic acid compound having the properties as shown in Table 9.

TABLE 9

|  |  | A-2 |
|---|---|---|
| Properties of polycarboxylic acid compound | Average number of functional groups | 4 |
|  | Acid equivalent (g/mol) | 336.7 |
| Property[1] | Non-volatile components (wt%) | 60.0 |

Note
[1] non-volatile components: dried at 50° C. at 0.1 mmHg for 3 hours

Preparation Example 11

Preparation of Thermal Latent Acid Catalyst G-1

Into a four-necked flask equipped with a thermometer, a reflux condenser, a stirrer, and a dropping funnel, 25.0 parts by weight of zinc octylate and 180 parts by weight of triethyl phosphate were charged, and stirred at room temperature. After the stirring at the room temperature for 5 hours, a thermal latent acid catalyst solution G-1 was obtained.

Preparation Examples 12 and 13

Preparation of Thermal Latent Acid Catalyst G-2 and G-3

Into a four-necked flask equipped with a thermometer, a reflux condenser, a stirrer, and a dropping funnel, a solvent, Lewis acid, and Lewis base as shown in Table 10 were charged, and stirred at 50° C. for 2 hours. After the mixture was allowed to cool down to the room temperature, the mixture was further stirred for about 1 hour, thereby obtaining thermal latent acid catalyst solutions G-2 and G-3 as shown in Table 10, respectively.

TABLE 10

|  |  |  | Preparation Example | |
|---|---|---|---|---|
|  |  |  | 12 | 13 |
| Thermal latent catalyst No. |  |  | G-2 | G-3 |
| Mixing ratio (parts by weight) | Solvent | butyl acetate | 69.1 | 71.6 |
|  | Lewis base | di-n-hexyl sulfide | 30.9 | — |
|  |  | tri-n-butylamine | — | 28.4 |
|  | Lewis acid | methyl ethyl ketone solution containing 20.9 wt% zinc chloride | 100.0 | 100.0 |
| Concentration of solution (% by weight) |  |  | 25.9 | 24.6 |

Examples 1 to 8

Application to Two Coat One Bake Metallic Color Coating Material (1) Preparation of clear coating material Starting materials having the composition as shown in Tables 11 and 12 were mixed, thereby obtaining one component clear coating materials.

(2) Preparation of test piece and study of coating film properties Cationic electrodeposition paint AQUA No. 4200 (trade name, manufactured by NOF CORPORATION) was electrodeposited on a soft steel plate treated with zinc phosphate for forming a film having the dry thickness of 20 μm, and baked at 175° C. for 25 minutes. Next, primer surfacer EPICO No. 1500 CP Sealer (trade name, manufactured by NOF CORPORATION) was applied over the previously formed film by air spraying for forming a film having the dry thickness of 40 μm, and baked at 140° C. for 30 minutes. Subsequently, silver metallic base coating material BELCOAT No. 6000 (trade name, manufactured by NOF CORPORATION) was applied over the previously formed film by air spraying in two stages at an interval of 1 minute and 30 seconds for forming a film having the dry thickness of 15 μm, and set at 20° C. for 3 minutes, thereby obtaining a test plate. Further, each of the clear coating material prepared in (1) above was diluted with a thinner (xylene) into an appropriate viscosity for coating (25 seconds at 20° C. using Ford Cup No. 4), applied over the test plate prepared above by air spraying, respectively, and baked at 140° C. for 30 minutes, thereby obtaining test pieces.

The properties of the obtained coating films are shown in Tables 11 and 12. In all cases, uniform coating films with glossy surface were obtained. The coating films exhibited excellent acid resistance, impact resistance, weatherability, abrasion resistance, and hardness, when they had been baked at 140° C.

(3) Study of storage stability

Each of the clear coating materials prepared in (1) above was diluted with a thinner (xylene) into 1 poise (as measured at 20° C. with a Brookfield type viscometer), and stored in a sealed state at 40° C. After the storage at 40 C for 30 days, the viscosity of the clear coating materials was measured again. As a result, it was revealed that little increase in the viscosity was observed as shown in Tables 11 and 12, which showed excellent storage stability of the coating materials.

surface was obtained. The coating film exhibited excellent acid resistance, impact resistance, weatherability, abrasion resistance, and hardness, when it had been baked at 140° C.
(3) Study of storage stability The raw coating material prepared in (1) above was diluted with a thinner (xylene) into 1 poise (as measured at

TABLE 11

|  |  | Example 1 | Example 2 | Example 3 | Example 4 |
|---|---|---|---|---|---|
| Mixing ratio of coating materials | Compound A-1 | 426.3 | 461.6 | — | — |
|  | Compound B-1 | — | — | — | — |
|  | Compound B-2 | — | — | 447.1 | — |
|  | Compound B-3 | — | — | — | 447.1 |
|  | Compound C-1 | — | — | 446.8 | 446.8 |
|  | Compound D-1 | 470.6 | — | — | — |
|  | Compound C-2 | — | 436.8 | — | — |
|  | Compound E | — | — | — | — |
|  | Compound G-1 | — | — | — | — |
|  | Compound G-2 | 45.3 | 44.7 | 46.7 | 46.7 |
|  | Compound G-3 | — | — | — | — |
| Concentration of functional groups in resin (mol/kg) | Concentration of epoxy group | 1.57 | 1.70 | 1.50 | 1.50 |
|  | Blocked carboxylic acid | 1.57 | 1.70 | 1.50 | 1.50 |
|  | Blocked hydroxyl group | 0.26 | 0.24 | 0.25 | 0.50 |
| Blocked carboxylic acid/Epoxy group (mole ratio) |  | 1.0 | 1.0 | 1.0 | 1.0 |
| Blocked hydroxyl group/Epoxy group (mole ratio) |  | 0.17 | 0.14 | 0.17 | 0.33 |
| Storage stability (40° C.) | Initial viscosity (poise) | 1.0 | 1.0 | 1.0 | 1.0 |
|  | Viscosity after 30 days (poise) | 1.3 | 1.3 | 1.4 | 1.3 |
| Properties of coating film | Acid resistance | good | good | good | good |
|  | Impact resistance | good | good | good | good |
|  | Weatherability[1] | 96% | 96% | 94% | 98% |
|  | Abrasion resistance[2] | ○ | ○ | ○ | ○ |
|  | Pencil hardness after baking at 140° C. for 20 min. | H | H | F | H |

Note [1] Weatherability: The test piece was exposed for 1000 hours, and then 60 degree specular gloss (Japanese Industrial Standard K-5400 (1990), 7.6 specular gloss) of the coating film was measured, using a sunshine weathermeter (Japanese Industrial Standard K-5400 (1990), 9.8.1), and compared with the specular gloss before the exposure.
[2] Abrasion resistance: ○ . . . Little abrasion
Δ . . . Some abrasion
X . . . Remarkable abrasion Example 9

Application to One Coat Solid Color Coating Material (1) Preparation of coating material Staring materials having the composition as shown in Table 13 were mixed, charged into a sand mill, and dispersed until the particle size of the solid components became 10 μm or less, thereby obtaining a one component coating material.
(2) Preparation of test piece and study of coating film properties Cationic electrodeposition paint AQUA No. 4200 (trade name, manufactured by NOF CORPORATION) was electrodeposited on a soft steel plate treated with zinc phosphate for forming a film having the dry thickness of 20 μm, and baked at 175° C. for 25 minutes. Next, primer surfacer EPICO No. 1500 CP Sealer (trade name, manufactured by NOF CORPORATION) was applied over the previously formed film by air spraying for forming a film having the dry thickness of 40 um, and baked at 140° C. for 30 minutes, thereby obtaining a test plate. Subsequently, the raw coating material prepared in (1) above was diluted with a thinner (xylene) into an appropriate viscosity for coating (flow rate of 25 seconds at 20° C. using Ford Cup No. 4), applied over the test plate obtained above by air spraying, and baked at 140° C. for 30 minutes, thereby obtaining a test piece.

The properties of the obtained coating film are shown in Table 13. In all cases, a uniform coating film with glossy 20° C. with a Brookfield type viscometer) , and stored in a sealed stated at 40° C. After the storage at 40° C. for 30 days, the viscosity of the coating material was measured again. As a result, it was revealed that little increase in the viscosity was observed as shown in Table 13, which showed excellent storage stability of the coating material.

TABLE 13

|  |  | Example 9 |
|---|---|---|
| Mixing ratio of Coating materials (parts by weight) | Compound C-1 | 349.0 |
|  | Compound B-2 | 283.0 |
|  | Compound G-3 | 33.0 |
|  | titanium dioxide[1] | 335.0 |
| Concentration of functional groups in resin (mol/kg) | concentration of epoxy group | 1.50 |
|  | blocked carboxylic acid | 1.50 |
|  | blocked hydroxyl group | 0.25 |
| Blocked carboxylic acid / epoxy group (mole ratio) |  | 1.0 |
| Blocked hydroxyl group / epoxy group (mole ratio) |  | 0.17 |
| Storage stability (40° C.) | Initial viscosity (poise) | 1.0 |
|  | Viscosity after 30 days (poise) | 1.2 |
| Properties of coating film | Acid resistance | good |
|  | Impact resistance | good |
|  | Weatherability[2] | 95% |

TABLE 13-continued

|  | Example 9 |
|---|---|
| Abrasion resistance[3] | ○ |
| Pencil hardness after baking at 140° C. for 20 min. | H |

Note
[1] Titanium dioxide JR-602: trade name, manufactured by TEIKOKU KAKO CO., LTD., rutile type titanium dioxide
[2] Weatherability: measured in the same method as for Table 11
[3] Abrasion resistance: evaluated in the same method as for Table 11

Comparative Examples 1 to 5

Coating materials were prepared in accordance with the composition shown in Table 14, coated articles were produced, and each test was conducted in the same way as in Examples 1 to 8. The results are shown in Table 14.

From the results shown in Table 14, it was revealed that the coating film of Comparative Example 1 was superior in acid resistance, impact resistance, weatherability, and hardness, but inferior in abrasion resistance. The coating films of Comparative Examples 2 and 3 had insufficient hardness. The coating material of Comparative Example 4 gelled after 10 days of storage since the functional groups, i.e. the carboxyl group and the epoxy group, were not blocked in the cross-linking reaction therebetween. The coating material of Comparative Example 5 gelled after 1 day of storage since this material did not contain the thermal latent catalyst.

TABLE 12

|  |  | Example 5 | Example 6 | Example 7 | Example 8 |
|---|---|---|---|---|---|
| Mixing ratio of coating materials | Compound A-1 | — | — | 489.5 | — |
|  | Compound B-1 | 436.2 | 462.2 | — | — |
|  | Compound B-2 | — | — | — | — |
|  | Compound B-3 | — | — | — | — |
|  | Compound C-1 | 462.9 | 490.8 | — | — |
|  | Compound D-1 | — | — | — | — |
|  | Compound D-2 | — | — | 463.1 | — |
|  | Compound E | — | — | — | 952.6 |
|  | Compound G-1 | 100.9 | — | — | — |
|  | Compound G-2 | — | — | 47.4 | 47.4 |
|  | Compound G-3 | — | 47.1 | — | — |
| Concentration of functional groups in resin (mol/kg) | Concentration of epoxy group | 1.54 | 1.54 | 1.70 | 2.00 |
|  | Blocked carboxylic acid | 1.54 | 1.54 | 1.70 | 2.00 |
|  | Blocked hydroxyl group | 0.51 | 0.51 | 0.24 | 0.50 |
| Blocked carboxylic acid/Epoxy group (mole ratio) |  | 1.0 | 1.0 | 1.0 | 1.0 |
| Blocked hydroxyl group/Epoxy group (mole ratio) |  | 0.33 | 0.33 | 0.14 | 0.25 |
| Storage stability (40° C.) | Initial viscosity (poise) | 1.0 | 1.0 | 1.0 | 1.0 |
|  | Viscosity after 30 days (poise) | 1.5 | 1.3 | 1.3 | 1.3 |
| Properties of coating film | Acid resistance | good | good | good | good |
|  | Impact resistance | good | good | good | good |
|  | Weatherability[1] | 94% | 95% | 98% | 93% |
|  | Abrasion resistance[2] | ○ | ○ | ○ | ○ |
|  | Pencil hardness after baking at 140° C. for 20 min. | F | F | H | F |

Note [1] Weatherability: The test piece was exposed for 1000 hours, and then 60 degree specular gloss (Japanese Industrial Standard K-5400 (1990), 7.6 specular gloss) of the coating film was measured, using a sunshine weathermeter (Japanese Industrial Standard K-5400 (1990), 9.8.1), and compared with the specular gloss before the exposure.
[2] Abrasion resistance: ○ . . . Little abrasion
Δ . . . Some abrasion
X . . . Remarkable abrasion

TABLE 14

|  |  | Comp. Ex. 1 | Comp. Ex. 2 | Comp. Ex. 3 | Comp. Ex. 4 | Comp. Ex. 5 |
|---|---|---|---|---|---|---|
| Mixing ratio of coating materials | Compound A-1 | 470.6 | — | — | — | 426.3 |
|  | Compound A-2 | — | — | — | 273.1 | — |
|  | Compound B-1 | — | — | 465.0 | — | — |
|  | Compound C-1 | 426.4 | 470.0 | — | 606.9 | — |
|  | Compound C-2 | — | — | — | — | — |
|  | Compound D-1 | — | — | — | — | 470.6 |
|  | Compound F-1 | — | 480.0 | 485.0 | — | — |
|  | Butylacetate solution containing 10.4% $ZnCl^2$ | — | — | — | — | 45.3 |
|  | Compound G-1 | 103.0 | — | — | 120.0 | — |
|  | Compound G-2 | — | 50.0 | 50.0 | — | — |

TABLE 14-continued

| | | Comp. Ex. 1 | Comp. Ex. 2 | Comp. Ex. 3 | Comp. Ex. 4 | Comp. Ex. 5 |
|---|---|---|---|---|---|---|
| Concentration of functional groups in resin (mol/kg) | Concentration of epoxy group | 1.74 | 1.5 | 0 | 2.07 | 1.57 |
| | Blocked carboxylic acid | 1.74 | 0 | 1.5 | 2.07 | 1.57 |
| | Blocked hydroxyl group | 0 | 1.5 | 0.75 | 0 | 0.26 |
| Blocked carboxylic acid/Epoxy group (mole ratio) | | 1.0 | 0 | 1.0 | 1.0 | 1.0 |
| Blocked hydroxyl group/Epoxy group (mole ratio) | | 0 | 1.0 | — | 0 | 0.17 |
| Storage stability (40° C.) | Initial viscosity (poise) | 1.0 | 1.0 | — | 1.0 | 1.0 |
| | Viscosity after 30 days (poise) | 1.4 | 1.1 | 1.1 | gelled | gelled |
| Properties of coating film | Acid resistance | good | worse | worse | good | good |
| | Impact resistance | good | good | good | good | good |
| | Weatherability[1] | 90% | — | — | 85% | 92% |
| | Abrasion resistance[2] | Δ | — | — | ○ | ○ |
| | Pencil hardness after baking at 140° C. for 20 min. | F | 3B> | 3B> | H | H |

Note [1]Weatherability: The test piece was exposed for 1000 hours, and then 60 degree specular gloss (Japanese Industrial Standard K-5400 (1990), 7.6 specular gloss) of the coating film was measured, using a sunshine weatherometer (Japanese Industrial Standard K-5400 (1990), 9.8.1), and compared with the specular gloss before the exposure.
[2]Abrasion resistance: ○ . . . Little abrasion
Δ . . . Some abrasion
X . . . Remarkable abrasion

What is claimed is:

1. A thermosetting composition comprising a resin having at least one functional group selected from the group consisting of a blocked hydroxyl group, blocked carboxylic acid, and an epoxy group, said composition having a blocked hydroxyl group, blocked carboxylic acid, and an epoxy group.

2. The thermosetting composition as claimed in claim 1 wherein said resin having at least one functional group selected from the group consisting of a blocked hydroxyl group, blocked carboxylic acid, and an epoxy group is selected from the group consisting of an acrylic resin having number average molecular weight of 500 to 100000, a polyester resin having number average molecular weight of 500 to 100000, and mixtures thereof.

3. The thermosetting composition as claimed in claim 1 wherein said blocked hydroxyl group has a structure represented by the formula selected from the group consisting of formulae (1) and (2) below:

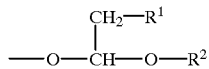

(1)

wherein $R^1$ stands for a hydrogen atom or an alkyl group having 1 to 10 carbon atoms, $R^2$ stands for an alkyl group having 1 to 22 carbon atoms of which hydrogen has been substituted or not substituted by at least one member selected from the group consisting of a cycloalkyl group, an aralkyl group, an aryl group, an alkoxyl group, an alkanoyloxy group, an alkyl group having 1 to 18 carbon atoms, and a halogen atom;

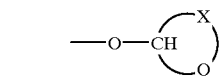

(2)

wherein X stands for an alkylene group having 1 to 18 carbon atoms of which hydrogen has been substituted or not substituted by at least one member selected from the group consisting of an alkoxyl group, an aralkyl group, an aryl group, an aryloxy group, an alkanoyloxy group, an alkyl group having 1 to 10 carbon atoms, and a halogen atom.

4. The thermosetting composition as claimed in claim 1 wherein said blocked carboxylic acid has a structure represented by the formula (3):

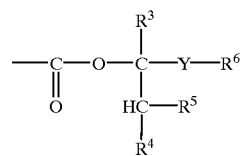

(3)

wherein $R^3$, $R^4$, and $R^5$ each stands for a hydrogen atom or an organic residue having 1 to 18 carbon atoms, $R^6$ stands for an organic residue having 1 to 18 carbon atoms, wherein $R^5$ and $R^6$ may be bound together to form a heterocyclic ring having Y as a hetero atom, wherein Y stands for an oxygen or sulfur atom.

* * * * *